(No Model.)

R. PRIETO Y CUBILLOS.
CARTRIDGE SHELL EXTRACTOR.

No. 506,937. Patented Oct. 17, 1893.

WITNESSES:
F. M. Ardle.
E. M. Clark

INVENTOR
R. P. y Cubillos
BY
Munn & Co
ATTORNEYS.

UNITED STATES PATENT OFFICE.

RODOLFO PRIETO Y CUBILLOS, OF BOGOTA, COLOMBIA.

CARTRIDGE-SHELL EXTRACTOR.

SPECIFICATION forming part of Letters Patent No. 506,937, dated October 17, 1893.

Application filed October 27, 1892. Serial No. 450,153. (No model.)

*To all whom it may concern:*

Be it known that I, RODOLFO PRIETO Y CUBILLOS, a citizen of the United States of Colombia, at present residing in Bogota, Colombia, South America, have invented a new and useful Improvement in Extractors for Cartridge-Shells, of which the following is a full, clear, and exact description.

This invention has for its object the extraction of broken cartridges or rather broken cartridge shells, from rifles, and it consists in a cartridge shell cutting extractor, substantially as hereinafter described and pointed out in the claims.

Reference is to be had to the accompanying drawings, forming a part of this specification, in which similar letters of reference indicate corresponding parts in both the figures.

Figure 1:
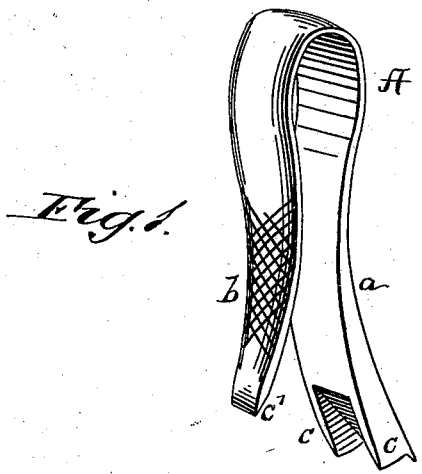
Figure 2:
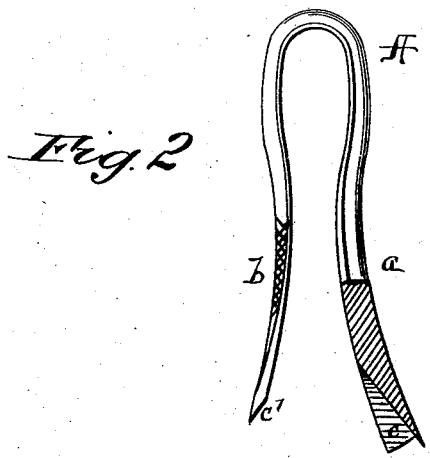

Figure 1 represents a view in perspective of the extractor; and Fig. 2 is a geometrical side view of the same with its free end portions in section.

The cartridge shell extractor which is the subject of this invention is not an attachment to the fire-arm or rifle but a separate article or device for removing a broken shell firmly lodged in the rifle or its bore. It is made preferably of U or V-shape and of very fine and highly tempered steel and forms in effect a loop-shaped spring. A, in the drawings, designates such an extractor which is constructed of two yielding fingers, $a, b$, conjoined in their rear and flaring outward at their free ends. The one, $a$, of these fingers is made of longitudinally grooved or U-shape internally at its extremity so as to present sharp cutting points or edges and forms a cutter $c$ for splitting or dividing the lodged shell, while the other and somewhat shorter finger $b$ is internally flattened at its extremity $c'$. These two fingers operate conjointly to remove the broken or lodged shell by compressing said fingers and forcing them by a ramrod applied to the conjoined ends of the fingers, down the grooves of a rifle of proper caliber having a broken or lodged cartridge or cartridge shell within it. In this way, the device operates as a sure extractor of the shell, the arm or finger $a$, cutting the lodged shell in two, while the shorter arm or finger $b$ with its flattened or pointed extremity entering behind the now loosened shell acts as a cutter or wedge and pusher to dislodge said shell.

Having thus described my invention, what I claim as new, and desire to secure by Letters Patent, is—

1. A cartridge shell extractor, comprising spring fingers having their lower ends formed into cutting edges, substantially as described.

2. A cartridge shell extractor, comprising spring fingers, one of which is formed with two cutting edges at its lower end and the other having a flattened extremity, substantially as described.

3. A cartridge extractor, consisting of the spring loop A having the fingers $a$ $b$, the finger $a$ being longitudinally grooved to form two cutting edges $c$, and the finger $b$ flattened at its extremity $c'$, substantially as herein shown and described.

RODOLFO PRIETO Y CUBILLOS.

Witnesses:
JOHN T. ABBOTT,
JEREMIAH COUGHLIN.